Oct. 28, 1969     C. F. STAPLES     3,474,493
MOLDING MACHINE FOR MAKING COMPACTED ABRASIVE ARTICLES
Filed Oct. 18, 1967     2 Sheets-Sheet 2
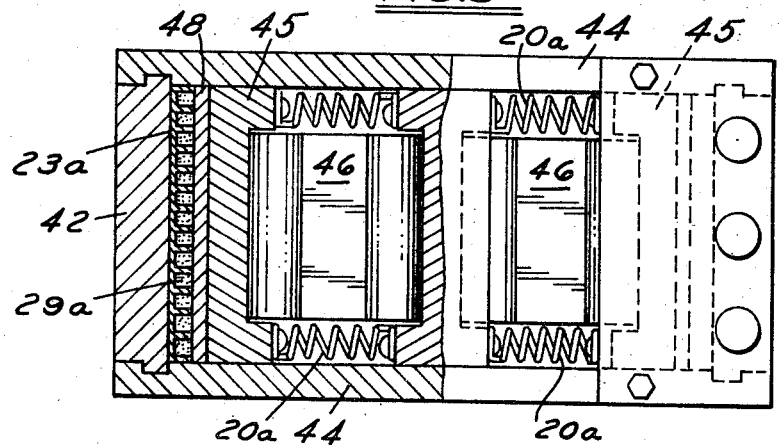
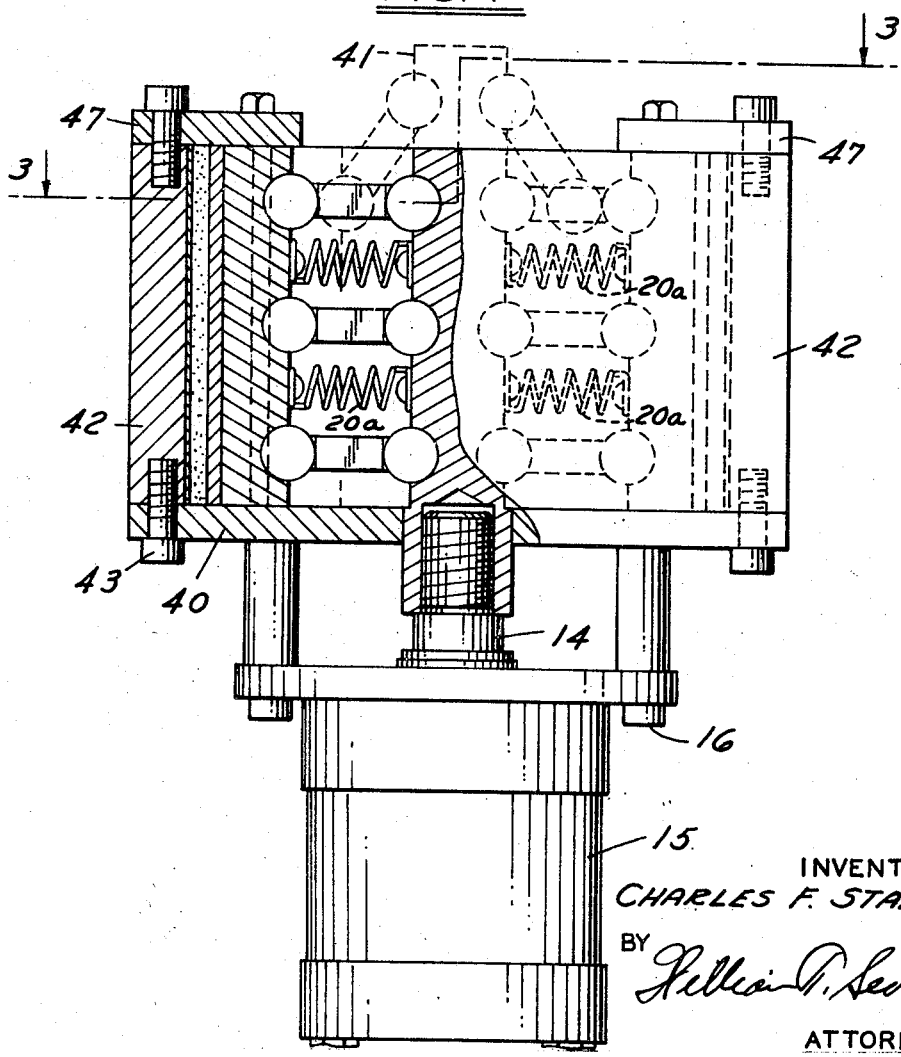
INVENTOR
CHARLES F. STAPLES
BY
*William P. Sevald*
ATTORNEY

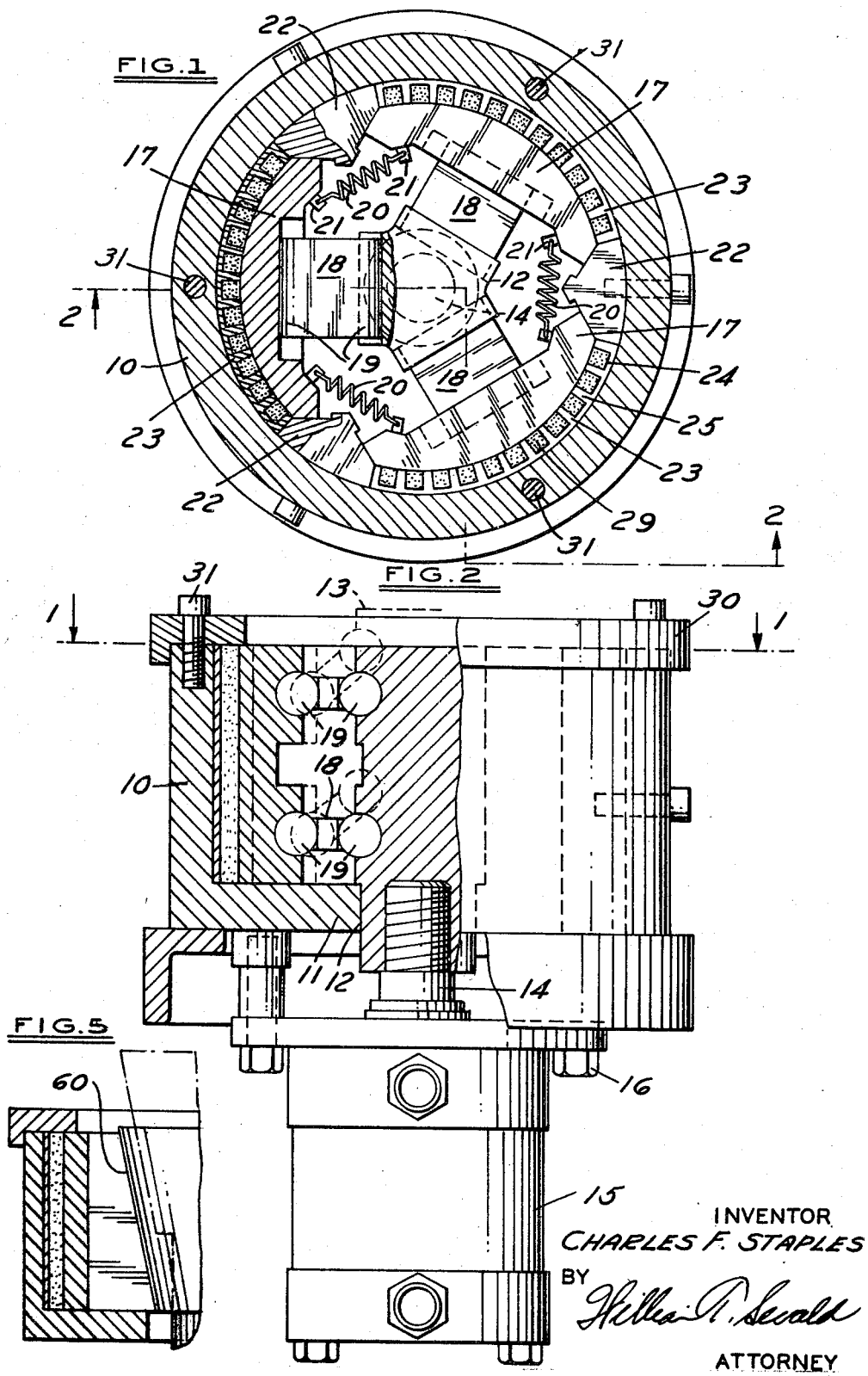

United States Patent Office 3,474,493
Patented Oct. 28, 1969

3,474,493
MOLDING MACHINE FOR MAKING COMPACTED
ABRASIVE ARTICLES
Charles F. Staples, 4456 Samoset Road,
Royal Oak, Mich. 48072
Filed Oct. 18, 1967, Ser. No. 676,328
Int. Cl. B29c 11/00, 24/00
U.S. Cl. 18—5                                      6 Claims

ABSTRACT OF THE DISCLOSURE

A molding machine for making compacted abrasive articles from a loose flour-like mix of grits and binder material having included air including means for moving the compacting rams faster and less forcefully in their initial compacting movement to quickly flow the mix evenly in the molds and to evacuate maximum included air from the mix while it is less dense and for moving the compacting rams progressively, more forcefully and more slowly as the mix density progressively increases, flow resistance progressively increases, and air evacuation resistance progressively increases thereby allowing more time for mix flow and more time for air evacuation while at the same time progressively increasing compaction forces in the final stage of compaction.

---

This invention relates to machines for making abrasive articles such as honing sticks, annular items, and blocks and in particular to a novel machine for compacting a loose mix of abrasive particles and binder material in the flour-like state having no form into a compacted state having form and shape.

Various machines have been employed heretofore to compact abrasive articles into semi-finished form prior to sintering or curing, but the machines have not proven satisfactory inasmuch as they are complicated in design and construction, expensive to manufacture, difficult to use, are massive, are limited to relatively low production, and have not satisfactorily solved the problem of eliminating the entrapment of air in the formed articles so that upon sintering or curing the article has objectional voids caused by the entrapped air leaving the article structurally unsatisfactory in the locations of the voids both in the semi-finished formed article and in the cured and sintered article.

In processes of manufacture, various states of the mix of abrasive particles and various binder materials have been employed such as a mastic state similar to putty, a dry powder or flour state, and a more or less fluid state of combined grits and binder material more plastic than the mastic state. These states or conditions relative to the machines employed to form the articles have not proven entirely satisfactory in that the mastic state is not sufficiently plastic to be readily moved and imperfectly formed or scrap articles result. The dry powder state is air loaded and the machines entrap the air so that the resultant articles are structurally unsound. The more or less fluid state permits the heavier particles to settle resulting in a non-homogenous abrasive article. Also the machines employed have not been able to correct these difficulties satisfactorily.

With the foregoing in view, it is a primary object of the invention to provide a machine for forming abrasive articles such as grinding wheels and blocks and honing sticks in a formed state for sintering and curing which eliminates air entrapment in the article and wherein the machines are simple in design and construction, inexpensive to manufacture, easy to use, highly productive in use, relatively fast in operation, and relatively non-critical in mixed loading, mixed compaction, and in removal of the compacted and formed article.

An object of the invention is to provide a vertically oriented machine which is loaded with the mix of grits and binder material in the flour-like state vertically from the top, which compresses the mix at an angle normal to vertical to permit contained air in the mix to escape vertically at the top and/or bottom, and which causes the flour-like mix to shift vertically during the preliminary movement of the rams so as to flow the mix in the article forming dies from the bottom with the mix compressing from the bottom toward the top vertically in a flour-like state prior to substantial compaction to fill the forming chambers or molds.

An object of the invention is to permit air to escape from the mix at the top and/or bottom during the movement of the compaction means both during the time the forming chambers are being evenly filled and subsequently while the mix is being compacted.

An object of the invention is to provide a machine having opposed compaction chambers so that the excessive pressures of the compressing means relative to the opposed chambers counter-balance one another.

An object of the invention is to provide container members for holding forming dies or chambers in opposed relationship relative to the compaction means so that the counter-balanced forces exerted by the compaction means are resisted in counter-balance by the container.

An object of the invention is to provide a vertically reciprocating power unit such as a hydraulic or pneumatic cylinder, crank, or screw jack operating an actuating head vertically in conjunction with opposed toggle arms actuating opposed rams so that the forces exerted are counter-balanced relative to the power supply means and to the actuating head.

An object of the invention is to provide molds for forming the abrasive articles in the shape and size suitably conforming to the finished article so that upon the mold being removed from the machine and the articles being removed from the mold they are ready for curing or sintering.

An object of the invention is to provide a machine which makes or produces a plurality of formed abrasive articles in one operation of the machine An object of the invention is to provide molds which are removably inserted in the machine so that the machine is adaptable to make formed articles of various sizes and shapes by the substitution of molds having the desired article conformation.

An object of the invention is to provide an easily removable and attachable cover for the machine so that the forming chambers may be easily and properly loaded with the mix of grits and binder material, so that the covers may be quickly attached to the machine, so that the covers properly and adequately confine the mix during article forming, so that the covers permit escapement of air without undue escapement of mix, and so that the covers may be readily removed after the articles are formed.

An object of the invention is to provide a linkage having mechanical advantage increasing in advantage as a resistance to compaction increases.

An object of the invention is to provide a machine having linkage having a mechanical advantage which decreases in speed of travel as compaction increases in density.

An object of the invention is to provide a machine having linkage with least mechanical advantage and greatest speed during the initial loose flour-like state or consistency of the mix material to quickly flow the material into the mold chambers so that the molds are completely filled and maximum mix contained air quickly evacuated with the mix at least density.

An object of the invention is to provide a machine having linkage with most mechanical advantage and least speed during the final stages of compaction of the mix material to slowly flow the material in the mold so that the chambers are evenly compacted and remaining contained air in the mix given maximum time to escape with the mix at maximum density.

These and other objects of the invention will become apparent by reference to the following description of the machines embodying the invention, taken in connection with the accompanying drawings in which:

FIG. 1 is a cross sectional view of the device seen in FIG. 2 taken approximately on the line 1—1 thereof.

FIG. 2 is a side elevational view of the device seen in FIG. 1, such as on the line 2—2 of FIG. 1, partly in cross section and showing internal construction in dotted lines.

FIG. 3 is a cross sectional view of the machine seen in FIG. 4 taken approximately on the line 3—3 thereof and showing internal construction in dotted lines.

FIG. 4 is a side elevational view of the machine seen in FIG. 3 partly in cross section such as taken on the line 4—4 thereof and showing internal construction in dotted lines; and FIG. 5 is a partial cross sectional view similar to FIG. 2 with parts taken away showing cam wedge compression means.

Referring now to the drawings wherein like numerals refer to like and corresponding parts throughout the several views, the abrasive article forming machines shown therein to illustrate the invention comprise a vertically oriented annular type in FIGS. 1 and 2 and a vertically oriented rectangular type in FIGS. 3 and 4.

Referring to the annular type container of FIGS. 1 and 2, an annular wall 10 surmounts a circular base 11. The wall 10 and base 11 may be integral as shown or may be separate and attached together by bolts. The circular base 11 has a central aperture 12. An actuating head 13 lies axially of the annular wall 10 and extends through the central aperture 12 of the base 11. A piston rod 14 connects to the actuating head 13 and a piston, not shown, is connected to the piston rod 14 and lies in a cylinder 15. The cylinder 15 is attached by bolts 16 to the circular base 11. Reciprocation of the piston rod 14 moves the actuating head 13 upwardly as indicated by dotted lines in FIG. 2 and downwardly as indicated by the solid line position shown.

A plurality of rams 17 lie between the actuating head 13 and the interior of the annular wall 10. The rams 17 are opposed and spaced circumferentially relative to one another and also spaced radially relative to the annular wall 10 and the actuating head 13. Paired or grouped toggle push links 18 lie between the actuating head 13 and the rams 17 and are equipped with ball ends 19 lying in spherical sockets in the actuating head 13 and rams 17.

It will be understood that with downward movement of the actuating head 13 from the dotted line position of FIG. 2 to the solid line position thereof that the toggle links 18 move from the dotted line showing to the solid line showing thrusting the rams 17 radially outwardly. Paired opposed springs 20 are linked between adjacent edges of the rams 17 such as by tabs 21 on the rams 17. It will be understood that upon movement of the actuating head 13 from the solid line position of FIG. 2 to the dotted line position thereof that the springs 20 retract the rams 17 radially inwardly. Vertical guides 22 lie between the rams 17 and channel the movement of the rams 17 radially.

Die members or molds 23 lie between the rams 17 and the annular wall 10. Each mold may have a plurality of chambers 29 for molding abrasive articles therein. The molds 23 are preferably made of a relatively flexible back web 24 and extending relatively rigid ribs 25. The mold web 24 and ribs 23 may be made of steel, plastic, rubber, or any other mateiral which is relatively flexible and incompressible to suit the needs of the machine. In the preferred embodiment of the device the back web 24 is made of spring steel and the ribs 25 are made of the same material or steel other than spring steel.

A removable cover 30 is secured to the annular wall 10 by bolts 31. The cover 30 has a central opening allowing the actuating head 13 to bypass the cover 30. The central opening of the cover 30 is so sized that the cover closes with the rams 17 adjacent their peak compression points and is slightly open relative to the rams 17 in the full retracted position of the rams. It has also been found that the cover may close relative to the rams 17 in all positions of the rams 17.

Various size, style, and configuration molds 23 may be employed and the chambers 29 may be any size and selective as to length, width, depth, etc. Spacers may be used relative to the molds 23 either between the molds 23 and the annular wall 10 or between the molds 23 and the rams 17. It will also be understood that the various molds 23 may have different configurations relative to one another as mounted in the machine so that various size and shape abrasive articles may be made in one operation of the machine.

To load the machine, the actuating head 13 is moved to the up position allowing the springs 20 to retract the rams 17 relative to the mold members 23 and the cover 30 is removed by unbolting the bolts 31. The space between the rams 17 and the mold members 23 is now open at the top and the tops of the channels 29 in the molds 23 are also open. The mix of abrasive particles and binder material of flour-like consistency is then loaded into the machine from the top and the space between the rams 17 and the mold members 23 is filled to a heighth which is found to be desirable by trial, error, and experiment relative to the particular particle size, the type of bonding material used, the size of the abrasive articles being made, the heighth of the molding chambers 29 and/or other conditions and considerations such as the volumetric capacity of the space between the ram 17 and the molding member as modified or changed by the presence or absence of spacer members as will be understood in the art.

Thus it will be understood that the mix may completely fill the space and chambers to the top of the wall 10 or may only fill same partially. The cover 30 is then replaced and the bolts 31 secured and under this condition it will be noted that air space, channels or clearance occurs between the various parts providing small air vents.

Thus the unsealed abutment of the cover 30 and the wall 10 is capable of transmitting air and the unsealed condition between the other various parts is capable of transmitting air relative to the contained air of the flour-like mix loaded in the machine.

Upon the cover 30 being secured on the annular wall 10 the cylinder 15 is actuated and moves the actuating head 13, toggle links 18, and rams 17 to compress the mix in the space between the rams 17 and the molds 23 while the head 13 moves down to the solid line position shown whereat the rams 17 have completely compressed the mix into the chambers 29 of the molds 23 in one stroke of the actuating head 13.

In this connection it will be important to note that while the actuating head 13 travels downwardly at approximately the same rate of speed, that the rams 17 travel outwardly at a relatively faster rate of speed during the initial travel of the actuating head 13 so that the rams 17 have a relatively high initial speed and a relatively low end speed as they arrive at their final radially outward compression position. Thus, the air contained in the mix is forced out of the mix at first relatively fast while the mix is relatively loose and is forced out subsequently relatively slow as the mix becomes relatively more dense. Also the speed of compaction is coordinated to the relative density of the mix so that while it is loose and least dense and while contained air is easily forced therefrom the compaction speed is relatively fast and compacting action less forceful whereas when the mix is relatively dense and air difficult to extract therefrom then the compaction speed is relatively slow and compacting action more forceful.

Upon the stick abrasive articles being formed, the actuating head 13 is moved to the up dotted line position and the cover 31 removed. The molds 23 are removed in their entirety from the machine and placed with chamber 29 side down on a surface and the flexible back 24 sprung so as to open the ribs 25 relative to one another thereby permitting easy extraction of the compacted abrasive articles from the forming chambers 29. After the compressed abrasive articles are removed from the molds 23, the molds are replaced in the machine, the machine reloaded, covered, and again activated in the next cycle.

Referring now to the rectangular type container machine seen in FIGS. 3 and 4, it will be noted that the rectangular base 40 has a central opening receiving the actuating head 41 which is attached to the piston rod 14 of the cylinder 15. The base 40 is connected to the cylinder 15 by bolts 16. End walls 42 are bolted to the ends of the base 40 by bolts 43. Sidewalls are secured to the base 40 and to the end walls 42 by bolts, inter-fitting, welding or otherwise. The side walls 44 are spaced and opposed and the end walls 42 are spaced and opposed. Paired opposed rams 45 lie adjacent to each end wall 42 in spaced relationship thereto. Toggle push links 46 lie between the actuating head 41 and the rams 45 and the links 46 are paired and grouped between the actuating head 41 and the rams 45. The links 46 may have ball ends as shown received in spherical sockets in the actuating head 41 and in the rams 45 as shown. Retraction springs 20a lie between the actuating head 41 and rams 45 to retract the rams 45 from the end walls 42 when the actuating head 41 moves upwardly to the dotted line position seen in FIG. 4.

The rectangular container is defined by the base 40, end walls 42, and side walls 44 has cover plates 47 at each end wall 42 extending over the adjacent ram 45.

In operation, the actuating head 41 is located at its dotted line position of FIG. 4 retracting the rams 45 relative to the end walls 42 thereby spacing the rams 45 from the molds 23a disposed between the end wall 42 and the ram 45. The space and chambers 29a between the ram and mold member 23a is filled with mix of abrasive articles and binder material as hereinbefore described relative to the annular embodiment of the machine. It will be noted at this point that spacers or a spacer 48 may be located in the space between the mold member 23a and the ram 45 to compensate for the relative size of the mold member 23a and articles to be made therein relative to the space between radially outer position of the ram 45 and the end wall 42. Obviously the spacers 48 may be of various thickness and size so that any size mold 23a may be used to form articles of various size and thickness as desired.

It will be noted that the end walls 42 are bolted to the rectangular base 40 and that the cover plates 47 are also bolted to the end walls 42 and to the side walls 44 and that no seals are employed. Thus there are no air tight connections between the parts so that small air channels and vents occur between the parts permitting the evacuation of air from the molding chambers 29a as the air is forced from the flour-like mix as the rams 45 are advanced toward the molds 23a.

FIG. 5 shows a wedge type cam actuating means 60 which may be substituted for the toggle actuating means where even rates of ram advancement are considered advantageous and it will be understood that other mechanical means may be employed such as a crank to produce harmonic motion within the purview of the invention to advance the rams and to retract the rams. In this connection it will be understood that while retraction springs are shown that pivotal pull links may be used between the actuating head and the rams to retract the rams and also to advance the rams if desired.

While only a few embodiments of the novel machine have been disclosed and described in detail it will be understood that many changes may be made in the size, shape, detail, or arrangement of the various elements of the invention within the scope of the appended claims.

I claim:

1. A machine for molding abrasive articles into compacted shape from a loose mix of abrasive particles and binder material of flour-like consistency having contained air, comprising a container having opposed vertical walls for counter balancing compression forces;

said container having a top and a bottom having central openings;

an actuating head in said container disposed vertically between said opposed walls and in alignment with said top and bottom central openings;

a drive device attached to said head for reciprocating said head vertically in said container;

a ram positioned between said head and each said opposed wall;

said rams counter balancing one another relative to said actuating head and said opposed walls;

toggle links lying between said actuating head and each said ram for moving said rams toward said opposed walls in one direction of reciprocating movement in a drive stroke to an advanced position;

means for moving said rams to a retracted position away from said walls relative to the opposite direction of reciprocating movement of said head, a mold for shaping abrasive articles lying between each said wall and ram and spaced from one said wall and ram and lying adjacent the other said wall and ram in the retracted position of said rams such as lying adjacent said walls and spaced from said rams so that a desired quantity of loose mix may be placed between said molds and said rams;

said top being removable for loading mix into said container and remountable to contain mix at the top of said container;

said bottom containing mix at the bottom of said container;

said top, bottom walls, molds, and rams having clearing spaces therebetween utilized as air escape vents for air in the mix being displaced by compaction of the particles and binder material.

said head upon being moved in its drive stroke by said drive means moving said rams toward said opposed walls and molds through said toggle links initially with maximum speed and minimum force, subsequently with decreasing speed and increasing force, and finally at the end of the drive stroked with minimum speed and maximum force;

said drive stroke of said head first moving said rams toward said molds and walls at maximum speed to first flow the mix relative to said molds while said mix is under least compressive force and at its maximum fluid state to evenly distribute the mix relative to said molds;

said drive stroke of said head after evenly distributing said mix relative to said molds, compacting said abrasive particles and binder material initially adjacent maximum speed and minimum force displacing contained air out said vents adjacent maximum rate with said mix at least density and maximum porosity, subsequently with decreasing speed and increasing force with said mix at increasing density and diminishing porosity, and finally at minimum speed and maximum force with the mix at maximum density and least porosity;

thereby compacting the mix from a loose formless state to a compacted shaped state of relative solidity with homogeneous abrasive particle, binder material, and porosity distribution.

2. In a machine as set forth in claim 1, said container being annular and said rams being located in opposition at circumferential positions.

3. In a machine as set forth in claim 1, said container being rectangular and said rams being located in opposition on at least one axis of the rectangle.

4. In a machine as set forth in claim 1, said container having nonsealably joined separate walls, top, and bottom to provide more air escape vents therebetween.

5. In a machine as set forth in claim 1, said mold having a springable back portion and rib side portions adapted to move away from one another upon springing said back portion to facilitate easy removal of the compacted abrasive article therefrom.

6. In a machine as set forth in claim 1, said toggle links being omitted and cam wedges substituted therefor.

References Cited

UNITED STATES PATENTS

| | | |
|---|---|---|
| 1,930,788 | 10/1933 | Buckner. |
| 2,157,779 | 5/1939 | Vance. |
| 2,449,407 | 9/1948 | Mulholland. |
| 2,767,428 | 10/1956 | Pingel. |
| 2,767,438 | 10/1956 | Pingel. |
| 3,059,278 | 10/1962 | Daniel. |
| 3,210,039 | 10/1965 | Long _____ 249—181 |
| 3,247,301 | 4/1966 | Praeg et al. _____ 18—36 X |
| 3,266,767 | 8/1966 | Long _____ 249—181 |
| 1,698,999 | 1/1929 | Hothersall. |

J. HOWARD FLINT, Jr., Primary Examiner

U.S. Cl. X.R.

18—45; 249—180